Oct. 8, 1968 C. F. CHONG ET AL 3,405,399

MATRIX SELECTION CIRCUIT

Filed June 16, 1964 3 Sheets-Sheet 1

INVENTORS
CARLOS F. CHONG
CHARLES A. NELSON

BY

Rene A. Kuypers

ATTORNEY

United States Patent Office 3,405,399

Patented Oct. 8, 1968

3,405,399
MATRIX SELECTION CIRCUIT

Carlos F. Chong and Charles A. Nelson, Philadelphia, Pa., assignors to Sperry Rand Corporation, New York, N.Y., a corporation of Delaware Filed June 16, 1964, Ser. No. 375,522
31 Claims. (Cl. 340—174)

ABSTRACT OF THE DISCLOSURE

The invention relates to a memory arrangement whereby any one of a plurality of memory elements can be connected either to a sense amplifier during a read cycle or a bit driver during a write cycle. For example, considering a memory with a capacity of 16,384 words of 9 bits each, one such word may be selected by energizing one of 1,024 drive lines. The selected word line will actually select 16 words of 9 bits each. However, the bit-sense matrix selection circuit of this invention selects only the 9 bits of the required word. The bit-sense matrix which acts as a low impedance switch couples these nine bits to the required nine sense amplifiers during a read cycle or during a write cycle, couples a steering current in any one of two directions to the nine bits of the selected word from nine different bit drivers.

The invention described herein was made in the performance of work under NASA contracts and is subject to the provisions of the National Aeronautics and Space Act of 1958, Public Law 85–568 (72 Stat. 426; 42 U.S.C. 2451), as amended.

This invention relates in general to a bit-sense matrix selection circuit. In particular, this invention relates to a switching circuit which acts as a low impedance switch to transmit very low level signals and also provides a path for transmitting current bi-directionally.

One of the problems associated with memory devices for digital computers has been that as the number of bits increases there is a corresponding increase of components. It can be appreciated that as the number of components of a large memory array increases, there is a greater opportunity for breakdown of various circuit elements thereby increasing the down time of a large computer installation. Such breakdowns are expensive and time consuming and engineering personnel is constantly expending time and effort to limit such breakdowns to a very minimum.

Another recognized problem in constructing a large memory has been the transmission delay associated with relatively long bit and sense lines. This results from the fact that without a bit-sense matrix, many words of short word length are required to build a large memory. By way of example, if a one million bit memory were constructed with a 50 bit word length and 20,000 words, the sense line delay will contribute about 250 nanoseconds to the cycle time of the memory.

It is therefore an object of the instant invention to provide a new and improved matrix device.

It is a further object of the instant invention to obtain a reduction in the amount of circuitry required in a memory system.

It is yet a further object of the instant invention to provide a switching circuit for use in a bit-sense matrix selection circuit which exhibits an improved signal-to-noise ratio.

It is still a further object of the instant invention to reduce the transmission delays in a memory device.

In accordance with a feature of this invention there is provided a switching circuit for use in a bit-sense matrix selection circuit which exhibits a low impedance thereby enabling a very small amplitude signal to be read out of a memory array storage element. The small amplitude signal read from a storage element is transmitted to a sense or read amplifier via the above-mentioned switching circuit not only with little attenuation but furthermore, the signal is accompanied with a minimum of noise so that good signal-to-noise ratio is obtained. The switching device also exhibits a high impedance when not energized so that unwanted voltages will not be passed to a sense amplifier and desired signals will not be passed into an unselected line. In other words, the switching device prevents back circuits or sneak paths to be formed.

As a further feature of the instant invention, three terminal semiconductor devices are utilized as the basic element of the above-mentioned switching circuit since not only do they provide a low "on" resistance to allow signals to pass with little loss but they also provide a high "off" resistance so that unwanted signals will not be passed to a sense amplifier. In one embodiment of the three terminal switching device, the switching or "turn-on" current does not pass through the sense path and hence, the switching current does not interfere with signal transmission through the bit-sense selection matrix.

Another feature of the instant invention consists in the selection of one of a group of bit-sense lines. By this means, the length of the transmission line can be reduced as well as reducing the amount of circuitry required for a digital memory device.

The novel features that are considered characteristic of this invention are set forth with particularity in the appended claims. The invention itself, however, both as to its organization and method of operation, as well as additional objects and advantages thereof, will best be understood from the following description when considered in conjunction with the accompanying drawings, wherein:

Figure 1:
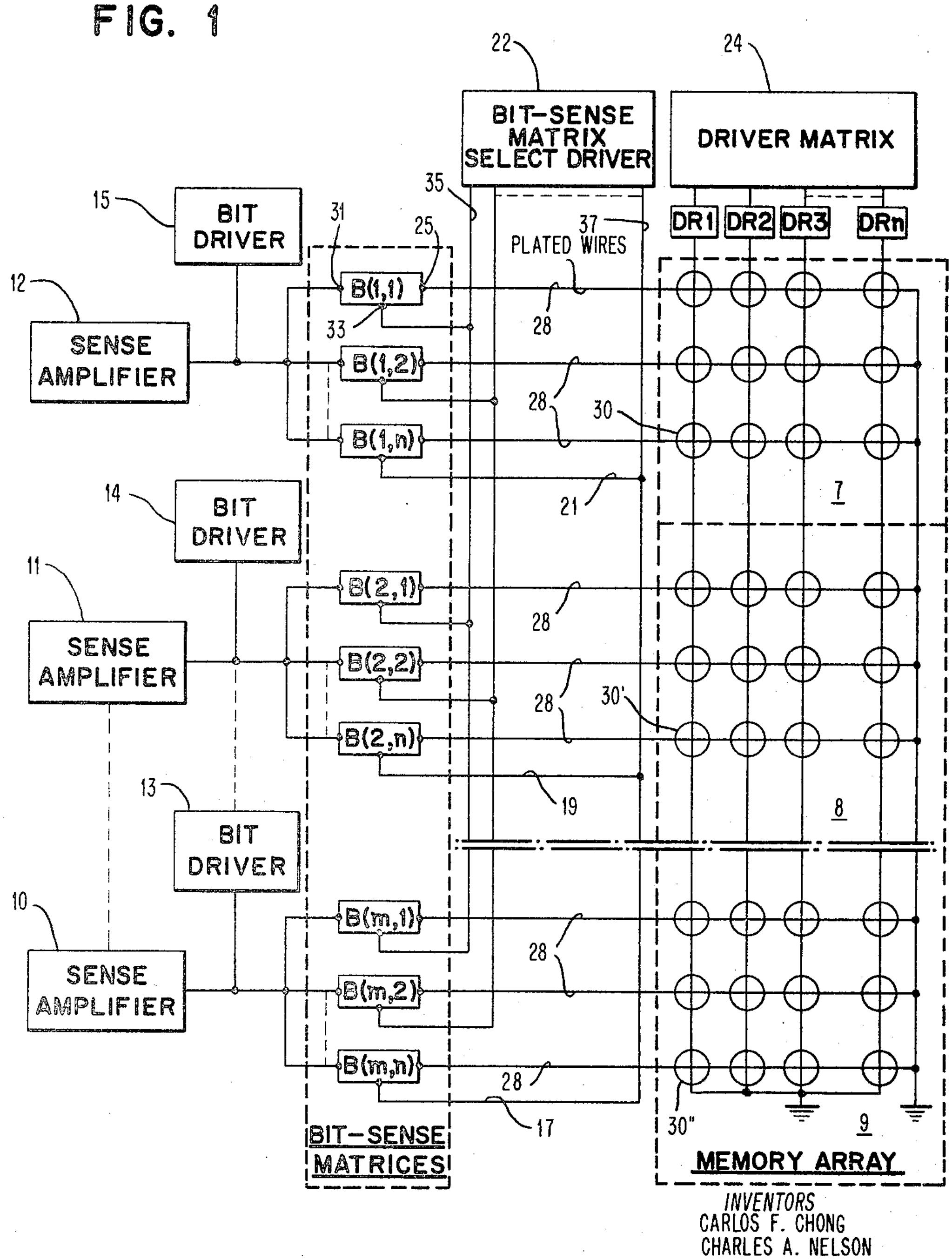
FIGURE 1 depicts a schematic of a memory including a bit-sense matrix using a one-dimensional selection.
Figure 2:
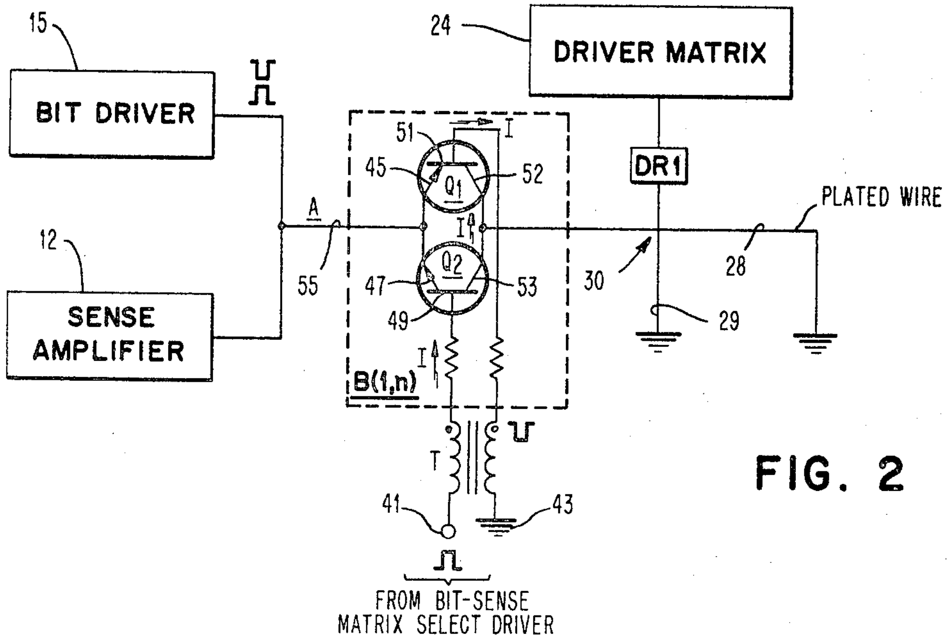
FIGURE 2 shows the switching circuit employed in the matrix selection circuit of FIGURE 1 in greater detail.
Figure 3:
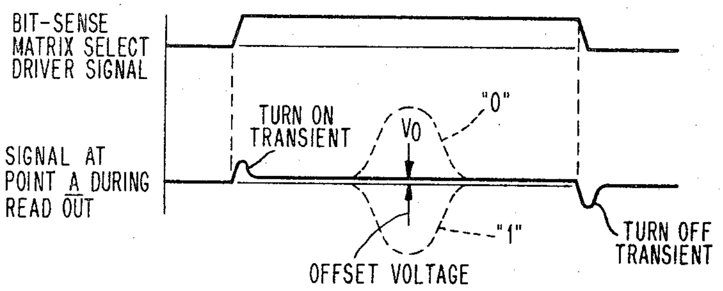
Figure 3A:
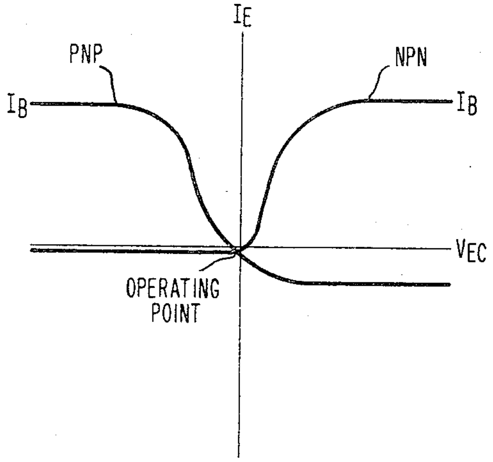
Figure 3B:
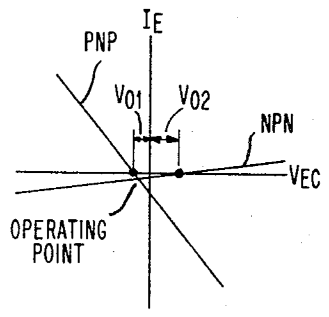
Figure 3C:
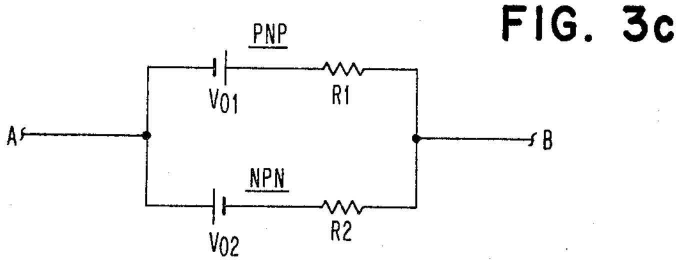
Figure 4:
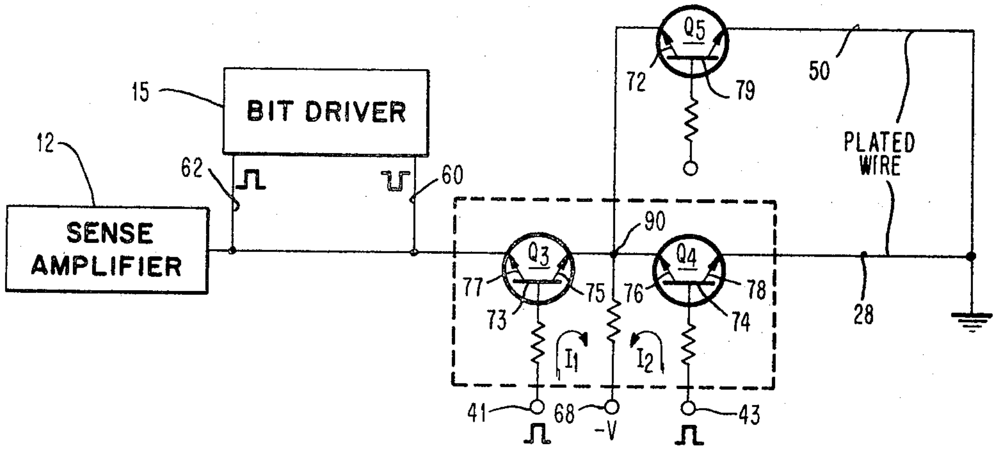
Figure 5:
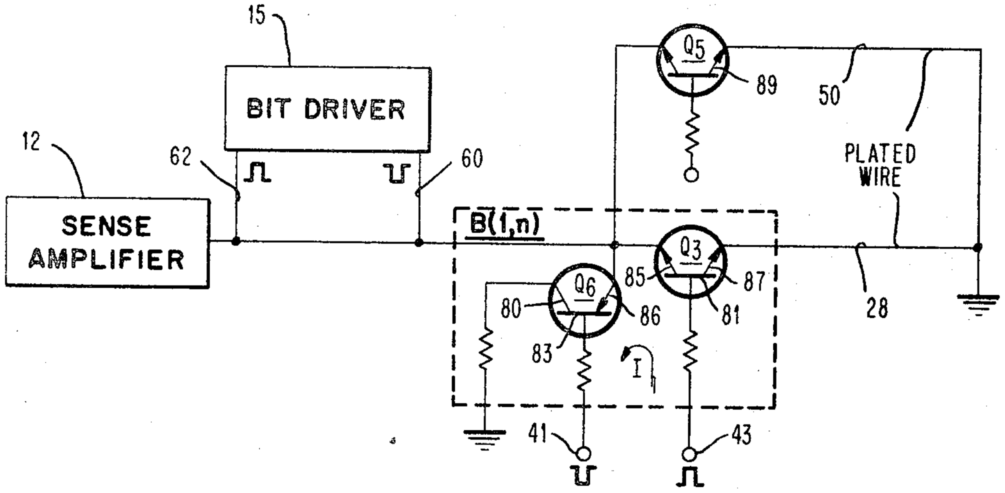

FIGURE 3 exemplifies typical waveforms of the switching circuit shown in FIGURE 2;

FIGURE 3*a* depicts typical $I_E$ vs. $V_{EC}$ characteristic curves for the NPN and PNP transistors used in the circuit of FIGURE 2;

FIGURE 3*b* depicts the $I_E$ vs. $V_{EC}$ characteristic curves for small signal operation;

FIGURE 3*c* depicts the small signal equivalent circuit of the embodiment shown in FIGURE 2 when operated in saturation;

FIGURE 4 depicts another circuit embodiment employing two bi-lateral NPN transistors in series connection for use in a two-dimensional matrix selection circuit;

FIGURE 5 depicts yet another circuit arrangement used in the matrix selection circuit of FIGURE 1 wherein a single bilateral NPN transistor is employed.

Referring now to the drawings and in particular to FIGURE 1, there is depicted a memory array incorporating a plurality of plated magnetic wires (all identified as 28). Positioned orthogonally to the plated wires are arranged a plurality of word straps DR–1 to DR–*m*. At the intersection of a plated wire and a drive line there is shown a small circle (e.g. 30, 30', 30'') to indicate a memory element on the plated wire or bit position of the memory array. It should be understood that although the memory element as described throughout this specification is with respect to a bit position along a plated wire, nevertheless, the invention is equally applicable to any non-destructive storage device. The use of the plated magnetic wire in conjunction with an orthogonally positioned word drive line is well known in the art and the pertinent facts relating thereto may be summarized as follows: The plated wire 28 is typically a five mil diameter beryllium copper wire substrate having a thin magnetic film formed on the surface thereof. The thin magnetic film, which is a nickel-iron alloy (Permalloy), is electroplated on the wire surface with a thickness of approxmiately 10,000 Angstroms. The Permalloy coating is electroplated in the presence of a circumferential magnetic field so that it acquires the property of uniaxial anisotropy axis at right angles (i.e. around the circumference) to the length of the wire. The uniaxial anisotropy establishes an "easy" and "hard" direction of magnetization and the magnetization vectors of the thin film are normally oriented in one of two equilibrium positions along the "easy" axis, thereby establishing two bistable states necessary for binary logic operation. The plated wires 28 of the memory array act as sense lines during a memory "read cycle" and further act as bit lines whenever it is required to write information into a certain bit position during a "write cycle." One end of the plated wire 28 is connected to one terminal, such as terminal 25, of a three-terminal switch B(1,1) whereas the other end of the plated wire is normally at ground potential.

Associated with and place substantially perpendicular and in juxtaposition to the plated wires are a plurality of equally spaced and substantially paralled drive lines DR-1 to DR-*n*. The drive lines are typically 20 mils wide and placed on 40 mil centers. Normally, the number of memory elements or bit positions formed by the intersection of a plated wire and a drive line comprise the number of bits of a single memory word. In the memory array of the instant invention however, there are a plurality of memory words under a single drive line. Thus, one memory word is formed from the bits 30, 30′ and 30″. It should be noted here that to form the memory word 30, 30′ and 30″ in conjunction with drive line DR–1, one plated wire is seletced from each group 7, 8 and 9 (each group being enclosed with dashed lines) of the memory array. Similarly, other words can be formed by selecting corresponding bit positions in each group. Each plated wire 28 is connected to a respective first terminal of a three-terminal switch. Therefore, the bit position described above, namely, 30, 30′ and 30″ are connected to their respective bit-sense matrix switches B(1, *n*) B(2, *n*) and B(*m*, *n*). In other words, the three-terminal switches are arranged into groups corresponding to the above discussed groups of plated wires 7, 8 and 9. It should be noted that any drive line of the memory array can be readily selected for a memory "read" or "write" cycle by means of a word driver matrix 24. The word driver matrix 24 allows the required drive line to be energized so that the magnetization vectors associated with a certain bit position are rotated from the "easy" toward the "hard" axis of magnetization.

Each of the second terminals (e.g. 31 of B(1, 1)) of a group of switches (e.g. B(1, 1), B(1, 2), B(1, *n*)) associated with a group of plated wires are connected to one another. The common connection of the second terminals of a switching group are further connected to what may be termed a group sense amplifier (e.g. 12) and a group bit driver (e.g. 15). It is therefore readily apparent from the above discussion that there is a single bit-sense switching circuit associated with each plated wire in a particular group of the memory array and furthermore, there is but a single sense amplifier and single bit driver serving each group of plated wires. Thus, the sense amplifier 11 and the bit driver 14 are associated with the plated wires in group 8 of the memory array and similarly, the sense amplifier 10 and the bit driver 13 are associated with the plated wires in group 9 of the memory array.

Each third terminal of a switch is connected to a particular drive line of the select drivers 22. By way of example, the third terminals of the switches B(1, 1), B(2, 1) and B(*m*, *n*) are connected to the select driver 35. Thus, by energizing the required select driver, the required switches of a group may be energized for a memory "read" cycle or a memory "write" cycle.

In view of the above discussion, if it is required to read the information stored in the bit positions 30″, 30′ and 30, the select driver 37 is energized thereby causing the switches B(1, *n*), B(2, *n*) and B(*m*, *n*) to become low impedance, low noise transmission devices. The information thereby passes from each of the memory elements 30″, 30′ and 30 to its respective sense amplifier, namely, sense amplifiers 10, 11 and 12. It should be understood, however, that in order to read out the information stored in the memory elements 30″, 30′ and 30, the word driver matrix 24 must selectively energize the drive line DR–1 during the same time period as the required switches are operative. The energized drive line DR–1 rotates the magnetization vectors at each memory element from the "easy" toward the "hard" axis of magnetization, thereby inducting a positive or negative voltage in the appropriate plated wire (sense line) in accordance, respectively, with whether a binary "zero" or "one" has been written therein.

In order to write or record new information (i.e. a binary "zero" or binary "one") into the memory elements 30, 30′ and 30″, the same switches B(1, *n*), B2, *n*), B(*m*, *n*) are energized by the same select driver 37. The switches B(1, *n*), B(2, *n*) and B(*m*, *n*) in accordance with this invention are adapted to transmit current in a bi-lateral direction from the respective bit drivers 13, 14 and 15 so that a binary "zero" or "one" may be written into the required memory elements. The bi-directional current from the bit drivers 13, 14 and 15 provides the required steering current so that the magnetization vectors are rotated through the 90 degree position (after being rotated to an angle less than 90 degrees by current in the drive line) so that the latter falls in the proper direction along the "easy" axis. In other words, each of the bit positions or memory elements 30, 30′ and 30″ along the plated wires 28 have two states of stable magnetic remanence and are capable of being switched into either of these two states so that a binary "zero" or "one" may be stored therein. By use of the bit-sense matrix switches as embodied in FIGURE 1, the length of the transmission path can be reduced and there can also be a reduction of the amount of circuitry in the memory. Thus, a conventional memory of 8,000 word lines of 36 bits each (36 plated wires) might, for example, be 32 feet long. The same size memory above (288,000 bits) in accordance with the instant invention can be formed by the intersection of one-thousand drive lines and 288 plated wires. Eight bit-sense matrix select drivers each select 36 of the 288 plated wires or 36 bits. The above memory length is reduced to four feet thereby reducing transmission line delays. Furthermore, the circuitry has been reduced by 7,000 word drivers.

The switches of FIGURE 1 will now be explained in greater detail by referring to FIGURE 2. FIGURE 2 shows the switch B(1, *n*) (see FIGURE 1) wherein an NPN transistor Q2 is connected to the PNP transistor Q1 in such a manner that the respective emitters 47 and 45 are connected to each other and the respective collectors 53 and 52 are also directly connected to each other. The junction of the two collectors is connected to a plated wire 28, which in turn is connected to ground potential. The junction of the two emitters is connected to the bit driver 15 and the read amplifier 12 by a common connection 55. It should be noted here that the junction of the two emitters and the junction of the two collectors are maintained at approximately the same potential, namely, ground. The base electrode 49 of transistor Q2 and the base electrode 51 of transistor Q1 are connected respectively to the primary and secondary windings of the 1:1 pulse transformer T. The terminal 41 of the primary of the transformer is further connected to a positive pulse applied by a select driver (such as driver 35, FIGURE 1) and the terminal 43 of the secondary of the transformer T is connected to ground potential. Other means to develop bi-polar pulses are readily obtainable using well-known state of the art techniques.

Let us assume that it is required to read out the binary information stored in the bit position 30 (also FIGURE 1). To read out this information, the drive strap DR–1 is energized by means of the word driver matrix 24. This action causes a positive or negative voltage (in the preferred embodiment the voltage is approximately 5 millivolts) to be induced in the plated wire 28. At some time before the pulse period of the drive signal from the drive strap DR–1, a second pulse from the select driver is applied to the terminal 41 of the transformer T. This signal is shown in greater detail in FIGURE 3. The positive pulse applied to the terminal 41 of the transformer T induces the same pulse but of opposite polarity in the secondary winding of the transformer. The positive and negative pulses applied to the respective base electrodes 49 and 51 cause a drive current I to be generated. This drive current I flows from terminal 41, through the collectors 53 and 52 and out of the base 51 to ground terminal 43. Current also flows through the emitter-base junctions since they are forward biased as are the collector-base junctions. However, most of the current flows through the collector junctions since the collector regions have the least resistance. When the transistors Q1 and Q2 operate so that drive current I is conducted through the base-collector junctions, the transistors act as low impedance switches, which can readily transmit a positive or negative signal induced on the plated wire 28 to the sense amplifier 12, as explained in greater detail below.

The impedance characteristics of the transistors Q1 and Q2 can be demonstrated graphically by referring to the $I_E$ vs $V_{EC}$ characteristic in FIGURE 3*a*. These curves represent typical forward and inverted gain characteristics of an NPN and PNP transistor for the same current $I_B$. The intersection of the two curves represents the operating point of transistors Q1 and Q2 at saturation. The saturation resistance $R_d$ of the NPN and PNP transistors can be readily obtained by determining the slope $(V_{EC}/I_E)$ of each transistor at the operating point. By referring to FIGURE 3*b* which is a small signal representation of the curves in FIGURE 3*a*, the PNP transistor exhibits a lower impedance than does the NPN transistor. The low impedance feature of the switch, B(1, *n*) is a significant feature since the signal induced in the plated wire 28 during a read cycle is approximately 5 millivolts and hence, it is imperative that this signal be transmitted across the low input impedance (approximately 100 ohms) of the read amplifier 12 virtually unattenuated.

When transistors Q1 and Q2 are "turned-on" and "off" a transient voltage appears at the common connection 55 (point A). This transient voltage is the result of circulating currents and unbalanced capacitances of the two transistors Q1 and Q2 and disappears shortly after turn-on as seen in FIGURE 3. If transistors with balanced capacitances are used, the transient voltages can be made to approach zero. The "turn-on" and "turn-off" transients of the circuit in FIGURE 2 are smaller than in a transistor circuit which has a common return source in that the select current I does not flow in the sense path, (i.e. the plated wire and the interconnection 55). This will be discussed in greater detail with regard to FIGURES 4 and 5.

The above-discussed operating point of transistors Q1 and Q2 is a function of the saturation impedances as well as the transistor offset voltages. The offset voltages $V_0$ (typically .5 to 2 millivolts) is defined as the emitter to collector voltage at a specified base current and no emitter current. In other words, when a base-collector current is supplied to a transistor with the emitter open circuited, the voltage measured from the emitter to collector will not be zero but instead there will be a floating potential of the same polarity as the base-emitter voltage.

The net offset voltage of the circuit of FIGURE 2 is lower than the offset voltages of the individual transistors which are small, and therefore the offset voltage of the circuit is small. The offset voltages, $V_{01}$ of the transistor Q1 and $V_{02}$ of transistor Q2, are depicted in FIGURE 3*b* as the distance between the ordinate, $I_E$, and the point at which the curves intersect the abscissa coordinate, $V_{EC}$.

The equivalent circuit (FIGURE 3*c*) of transistors Q1 and Q2 exemplify how the operating point is a function of the two offset voltages and the saturation impedances. It is clear from the equivalent circuit that the net impedance at the operating point and as seen by the induced signal in the plated wire during a read cycle is the equivalent impedance resulting from the parallel arrangement. In actuality, the impedance R2 is considered higher than impedance R1 for illustrative purposes only. Furthermore, the net offset voltage $V_0$ (FIGURE 3) of the embodiment in FIGURE 2 is in effect lowered. This can be shown from the equivalent circuit in FIGURE 3*c* where the net offset equals, for example, the offset voltage $V_{02}$ minus the voltage drop across impedance R2 times the loop current which flows in the clockwise direction.

The low offset voltage of the low impedance switch above described can be appreciated by referring to FIGURE 3 which shows the positive (binary "zero") or negative (binary "one") read out signal superimposed upon the offset voltage. In view of the low offset voltage obtained by the switch B(1, *n*), there is good discrimination (i.e. good signal-to-noise ratio) between the read signal and the offset voltage.

The operation of the switch B(1, *n*) will now be described for a memory "write" operation. As understood in the plated wire art, and as briefly described above, in order to write either a binary "zero" or binary "one" into the memory element 30 of the plated wire the word driver 29 (DR–1) is energized via the word driver matrix 24 in order to rotate the magnetization vectors of the thin film to some angle less than 90 degrees. The current from the bit driver 15 (FIGURE 2) produced by either a positive or negative current pulse steers the magnetization vectors through the 90 degree angle so that a binary "one" or binary "zero" may be written into the memory position 30. Positive current is defined for the sake of convenience as the current flowing "down" the plated wire 28 (toward the right as viewed in the drawing) and which will enable a binary "one" to be recorded. Negative current is defined as the current flowing "up" the plated wire 28 (toward the left as viewed in the drawing) and which will enable a binary "zero" to be recorded.

Thus, the NPN transistor Q2 transmits the information current when a negative current is supplied by the bit driver 15 and the PNP transistor passes the information current when the bit driver supplies a positive current pulse. In other words, when it is required to write a binary "one" into the memory element 30 on the plated wire 28, the PNP transistor Q1, being forward biased by a positive pulse applied to the terminal 41 (which becomes negative in the secondary of transformer T), passes a concurrent positive pulse applied by the bit driver 15. A current flow is thereby established from the bit driver 15 through the emitter 45 and the collector 52 of transistor Q1 through the plated wire to ground. Similarly, if a binary "zero" is to be written into the memory position 30, the NPN transistor Q2, being forward biased by the positive pulse applied to the base 49 via the primary of the transformer T (terminal 41), passes the concurrent negative signal from the bit driver 15. Current flows in this arrangement from ground potential into the plated wire 28, through the collector 53 and emitter 47 of transistor Q2 to the bit driver 15. As can be readily appreciated from the above description, the bi-directional switch B(1, *n*) transmits information current in either direction so that either a binary "zero" or a binary "one" may be written into a certain memory location.

FIGURE 4 depicts another bi-directional switching circuit for use in a two-dimensional matrix selection circuit. The circuit of FIGURE 4 differs from the circuits of FIGURE 2 in that two bi-lateral transistors are utilized in series connection with the plated wire 28. Thus, the switching circuit comprises two bi-lateral transistors Q3 and Q4 wherein the electrodes 75 and 76 are connected to each other. Another bit-sense matrix circuit could be formed by means of the bi-lateral transistors Q3 and Q5 in conjunction with plated wire 50. It should be noted that a symmetrical or bi-lateral transistor consists of an NPN or PNP in which the collector and emitter junctions are physically identical. Thus, if one junction is biased in the reverse direction, and the other in the forward direction, the first junction becomes the collector and the second becomes the emitter of the transistors.

During a "read" cycle, positive pulses from the bit-sense matrix select drivers (the unit 22 of FIGURE 1) are applied, respectively, to the base electrodes 73 and 74 of the bi-lateral transistors Q3 and Q4 via terminals 41 and 43. The drive current $I_1$ immediately flows from terminal 41 to the current sink, —V (terminal 68), via the electrodes 73 and 75; at the same time, the drive current $I_2$ flows from the source of positive potential from terminal 43 to the negative sink, —V, via the electrodes 74 and 76.

When the positive drive pulses are simultaneously applied to the base electrodes of both bi-lateral transistors Q3 and Q4 and there is a concurrent drive signal applied to a word drive line (not shown) positioned orthogonally to the plated wire 28, and as a result a positive or negative voltage of approximately 5 millivolts is induced and transmited to the sense amplifier 12 virtually unattenuated. The pulse induced in the plated wire is transmitted virtually unattenuated since the bi-lateral transistors Q3 and Q4 provide low impedance circuit paths when driving pulses are applied to terminals 41 and 43 by the matrix select driver 22 (FIGURE 1). If information is to be read out of a certain memory location along the plated wire 50, then a positive pulse would be applied to the base electrode 79 of the transistor Q5 in conjunction with the positive voltage applied to the base 73 of the transistor Q3. A voltage induced in the plated wire 50 during the "read" cycle would therefore be transmitted to the sense amplifier 12 via the low impedance paths provided by the bi-lateral transistors Q3 and Q5. The circuit of FIGURE 4 finds particular application in a two-dimensional matrix circuit (i.e. a matrix circuit which requires that two switches be closed to read out information). Although the drive current $I_1$ and $I_2$ flows in part of the sense path, the circuit of FIGURE 4 is particularly useful where the number of components must be held to a minimum.

The bi-lateral transistors Q3 and Q4 can pass both positive or negative information current (in accordance with the above-mentioned convention) whenever it is required to write either a binary "zero" or a binary "one" at a certain bit location of the plated wire 28. Thus, when a positive current is supplied by the bit driver 15 via terminal 62 and simultaneously positive pulses (less positive than the first mentioned positive pulses) are applied to the base electrodes 73 and 74, the bi-lateral transistors Q3 and Q4 become forward biased. Positive current is therefore transmitted from the terminal 62, through the collector and emitter electrodes 77 and 75 of bi-lateral transistor Q3, respectively, through the collector 76 and emitter 78, through the plated wire 28 to ground. The base current to transistors Q3 and Q4 supplied from electrodes 73 and 74 are sufficiently large to keep the transistors in saturation when current is supplied by the bit driver. This results in a small voltage drop across the transistors Q3 and Q4 due to current flow. This current in conjunction with the current in the drive line (not shown) positioned orthogonally to the plated wire 28 is sufficient to write a binary "one" into the required bit position.

In like manner, when information current is required to write a binary "zero" at a bit position along the plated wire, a negative current pulse is applied at terminal 60 of the bit driver 15 concurrently with the positive signals applied to bases 73 and 74. According to this circuit biasing arrangement, the electrode 77 now becomes the emitter and the electrode 75 becomes the collector of the bi-lateral transistor Q3. In like manner, bi-lateral transistor Q4 becomes forward biased since the base 74 is more positive than the junction 90. Since both the transistors Q3 and Q4 are forward biased, current is conducted from ground at one end of the plated wire 28 to negative terminal 60 of the bit driver 15 via the low impedance path provided.

In a similar manner, the transistors Q3 and Q5 would operate in conjunction with the plated wire 50 as just described for the transistors Q3 and Q4. As can be appreciated from the above discussion, the bi-lateral transistors in series connection operate as a low impedance switch for a memory "readout" cycle, and at the same time provide bi-directional circuit paths for information current from the bit driver for a "write" cycle.

The circuit depicted in FIGURE 5, which may be used in a one-dimensional matrix selection circuit, is similar in operation to that just described in regard to FIGURE 4. Thus, in the circuit of FIGURE 5, only one NPN bi-lateral transistor Q3 is used to provide low impedance switching during the "read" operation and a bi-directional path for information current. A conventional PNP transistor Q6 provides a circuit path to a current sink or negative potential at terminal 41. Thus, positive and negative driving pulses are applied to the base electrodes 81 and 83, respectively, during a memory "read" cycle so that the current I flows from the terminal 43 to terminal 41. As in the circuit embodiments of FIGURE 4 when a driving current applied through the base and the electrodes 85 and 87 are maintained at relatively the same voltage, the bi-lateral transistor Q3 acts as a low impedance switch. Thus, a signal induced in the plated wire 28 in the energizing of a drive line (not shown) is transmitted virtually unattenuated to the sense amplifier 12. It is readily apparent that the transistor Q6 might easily be replaced by a diode wherein the anode is connected to the emitter 85 and the cathode is connected to terminal 41.

During the write cycle, when current to record a binary "zero" is to be supplied by the bit driver 15 to the plated wire 28, a negative pulse is applied at terminal 60 of bit driver 15 concurrently with a positive pulse at terminal 43. These applied signals forward bias Q3 so that current is conducted from ground, through the collector 87 and emitter 85 to terminal 60.

When information current is required to record a binary "one" in a memory location along plated wire 28, a positive current pulse is supplied from terminal 62 of bit driver 15 and a positive pulse is applied to terminal 43 thereby forward biasing Q3. Current is thereby conducted from terminal 62, through the plated wire 28 to ground via the collector 85 and the emitter 87.

Obviously, many modifications and variations of the present invention are possible in the light of the above teaching. It is therefore to be understood that in the scope of the appended claims, the invention may be practiced otherwise than as specifically described.

The embodiments of the invention in which an exclusive property or privilege is claimed are defined as follows:

1. A memory arrangement for a read and write cycle comprising:

(a) a memory element having two states of stable magnetic remanence and capable of being switched into either of said two states, said two states of remanence comprising first and second stored information signals;

(b) a drive line magnetically linking said memory element by means of an energizing signal;

(c) a separate line magnetically linking said memory element;

(d) information means providing current in either a first or second direction, said current generating a magnetic field substantially orthogonal to the field produced by said drive line;

(e) detector means coupled to said information means, said detector means determining whether said first or second signals is stored on said memory element;

(f) semiconductor switching means having first and second terminals, said first terminal being common connected to both said information and said detector means, said second terminal being connected to said separate line, said switching means providing a low impedance path for said first or second information signal during said memory read cycle when said drive line magnetically links said memory element, said switching means further conducting current from said information means in a first or in the alternative, in a second direction during a write cycle to store, respectively, said first or second signal, said current from said information means being applied when said drive line magnetically links said memory element.

2. A circuit apparatus in accordance with claim 1 wherein said memory element comprises a signal conducting means having a thin magnetic film formed on the surface thereof, said thin magnetic film having "easy" and "hard" directions of magnetization.

3. A circuit apparatus in accordance with claim 1 wherein said information means comprises a bit driver.

4. A switching circuit in accordance with claim 1 wherein said detector means comprises a sense amplifier.

5. A memory arrangement in accordance with claim 1 wherein said switching means comprises a first and second current conducting device in parallel connection.

6. A memory arrangement in accordance with claim 5 wherein said first and second current conducting devices comprise respectively a first and second semiconductor device in parallel connection wherein each said first and second device have an emitter, collector and base electrode, said respective emitter electrodes being connected to one another and said respective collector electrods being connected to one another, the junction between said collector electrodes being connected to said separate line magnetically linking said memory element and the junction between said emitter electrodes being connected to said information and detector means.

7. A memory arrangement in accordance with claim 6 wherein said respective base electrodes are connected to a simultaneous energizing means.

8. A memory arrangement in accordance with claim 7 wherein said first semiconductor device comprises an NPN transistor and said second semiconductor device comprises a PNP transistor.

9. The memory arrangement in accordance with claim 8 wherein said base electrode of said NPN transistor is energized with a positive signal and the base electrode of said PNP transistor is energized by a negative signal.

10. A memory arrangement in accordance with claim 5 wherein said first and second current conducting devices comprises semiconductor devices each having first and second N junctions and a P junction, said first N junction of said first semiconductor device being connected to said second N junction of said second semiconductor device, said N junctions being further connected to a voltage means, said second N junction of said first device being connected to said separate line magnetically linking said memory element, said first N junction of said second device being coupled to said detector and said information means.

11. A memory arrangement in accordance with claim 10 wherein the P junctions of said first and second semiconductor devices are both simultaneously energized by a positive signal.

12. A memory arrangement in accordance with claim 1 wherein said switching means comprises a first and second current conducting device in series connection, said devices conducting current in either a first or second direction.

13. A memory arrangement in accordance with claim 12 wherein said first and second current conducting devices comprise respective bi-lateral conducting devices.

14. The memory arrangement in accordance with claim 13 wherein said bi-lateral device comprises first and second N junctions and a P junction and said semiconductor device comprises first and second P junctions and an N junction, the first N junction of said bi-lateral device being connected to said first P junction of said semiconductor device, said second P junction being connected to ground.

15. The memory arrangement in accordance with claim 14 wherein the P junction of said bi-lateral device is energized by a positive signal and the N junction of said semiconductor device is energized by a negative signal.

16. A memory arrangement in accordance with claim 14 wherein the second N junction of said bi-lateral device is connected to said separate line magnetically linking said memory element.

17. The memory arrangement in accordance with claim 14 wherein the said second N junction of said bi-lateral and the said first P junction of said semiconductor device are coupled to both said detector and information means.

18. A memory arrangement in accordance with claim 1 wherein said switching means comprises a single bilateral conducting semiconductor device and a semiconductor device which conducts in only one direction, said latter device being connected to said bi-lateral device to provide a current sink therefor.

19. A memory system which comprises:

(a) a plurality of magnetic storage bits each of which is characterized by being non-destructive on read out, said plurality of storage bits representing a plurality of multi-bit data words, (b) a word line magnetically linking all of said plurality of storage bits by an energizing signal, (c) separate bit sensing lines each magnetically linking a respective storage bit of said plurality of storage bits, (d) a set of output terminals corresponding in number to the number of bits in a data word, and (e) a selective switching network intercoupling said set of output terminals to said bit sensing lines, said switching network being operative to couple the bit sensing lines corresponding to a selected data word of the plurality of data words linked by said word line to said set of output terminals.

20. The combination of claim 19 including a current driver circuit for passing a non-destructive read-out current down said word line to excite said plurality of storage bits and to produce an output on said set of output terminals according to the information stored in the said selected data word.

21. The combination of claim 19 wherein said magnetic storage bits having a separate sensing lines magnetically linking the storage bits comprises a plated wire with a magnetic coating having the property of uniaxial anisotropy.

22. The memory system in accordance with claim 21 wherein said magnetic coating comprises a ferromagnetic material having an approximate thickness of 10,000 Angstroms.

23. The memory system in accordance with claim 19 wherein said switching network is further coupled to a sense amplifier means and current driver means.

24. A memory system which comprises:

(a) a plurality of magnetic storage bits each of which is characterized by being non-destructive on read out,
said plurality of storage bits representing a plurality of multi-bit data words,
said storage bits being divided into groups wherein the memory elements of a group comprise the corresponding storage bits of any one of said plurality of data words,
(b) a word line magnetically linking all of said plurality of storage bits by an energizing signal,
(c) separate bits sensing lines each magnetically linking a respective storage bit of said plurality of storage bit,
(d) a set of output terminals corresponding in number to the number of bits,
(e) a plurality of sensing means to distinguish between a first and second binary signal stored on a storage bit,
(f) a plurality of bit steering current means to provide current in a first or second direction to said storage bits in order to record respectively a first or second binary signal on a storage bit,
said bit steering current being applied to a storage bit at the same time that said word line magnetically links said plurality of storage bits,
(g) a selective switching network intercoupling each different one of said set of output terminals to a respective bit sensing lines,
said switching network being operative to couple the bit sensing lines corresponding to a selected data word of the plurality of data words linked by said word line to said set of output terminals,
the output terminals corresponding to the bits of a group being coupled to a single sensing means and a single bit steering current means.

25. A memory selection circuit comprising:
(a) a plurality of magnetic storage bits each of which is characterized by being non-destructive on read out,
said plurality of storage bits representing a plurality of multi-bit data words,
said storage bits being divided into groups wherein the memory elements of a group comprise the corresponding storage bits of any one of said plurality of data words,
(b) a word line magnetically linking all of said plurality of storage bits by an energizing signal;
(c) separate bit sensing lines each magnetically linking a respective storage bit of said plurality of storage bits,
(d) a set of output terminals corresponding to the number of bits,
(e) a plurality of sensing means to distinguish between a first and second binary signal stored on a storage bit, said sensing means being equal in number to the bits in one word,
(f) a plurality of bit steering current means to provide current in a first or second direction to said storage bits in order to record respectively a first or second binary signal on a storage bit,
said bit steering current being applied to a storage bit at the same time that said word line magnetically links said plurality of storage bits,
(g) a plurality of selective switching networks, each network intercoupling one of said set of output terminals to one of said bit sensing lines,
(h) means connected to said networks for energizing only selected ones of switching networks in order that said switching network selects one memory element of a group corresponding to one selected data word out of said plurality of data words,
said switching network being operative to couple to the bit sensing lines magnetically linking said select bits.

26. The combination comprising:
(a) a first semiconductor device having a first and second N junction and a P junction,
(b) a second semiconductor device having first and second P junctions, and an N junction,
said first N junction being directly connected to said first P junction, and said second N junction being directly connected to said second P junction,
(c) means connected to said P junction of said first semiconductor device and to said N junction of said second semiconductor device for driving said first and second semiconductor devices into a low impedance state by initiating a majority current flow through the PN junctions having the least resistance.

27. The combination in accordance with claim 26 wherein a sensing line magnetically linking a storage bit is connected to the junction between the second N junction and the second P junction.

28. The combination in accordance with claim 26 wherein a sense amplifier is coupled to the junction between said first N junction and said first P junction.

29. The combination in accordance with claim 28 wherein a bit driver is further coupled to the junction between said first N junction and said first P junction.

30. The combination in accordance with claim 26 wherein means are further connected to the direct connection between the first and second semiconductor devices for conducting current in a first or second direction through said respective first or second semiconductor device.

31. The combination in accordance with claim 30 wherein a positive signal is applied to the P junction of said first semiconductor device and a negative signal to the N junction of said second semiconductor device.

References Cited

UNITED STATES PATENTS

| | | | |
|---|---|---|---|
| 2,962,699 | 11/1960 | Endres. | |
| 3,137,797 | 6/1964 | Reach et al. | |
| 3,204,125 | 8/1965 | Beckerich. | |
| 3,137,843 | 6/1964 | Gaunt | 340—174 |
| 3,270,326 | 8/1966 | Schwartz et al. | 340—174 |

BERNARD KONICK, *Primary Examiner.*

P. SPERBER, *Assistant Examiner.*